United States Patent
Kim

(10) Patent No.: US 9,985,457 B2
(45) Date of Patent: May 29, 2018

(54) CHARGER FOR BLOCKING STANDBY POWER AND METHOD OF CONTROLLING SAME

(71) Applicant: MILPROS CO., LTD., Hwaseong, Gyeonggi-Do (KR)

(72) Inventor: Chang-Ho Kim, Seoul (KR)

(73) Assignee: MILPROS CO., LTD., Hwaseong, Gyeonggi-do (KR)

( * ) Notice: Subject to any disclaimer, the term of this patent is extended or adjusted under 35 U.S.C. 154(b) by 328 days.

(21) Appl. No.: 14/498,742

(22) Filed: Sep. 26, 2014

(65) Prior Publication Data

US 2015/0015191 A1    Jan. 15, 2015

Related U.S. Application Data

(63) Continuation of application No. PCT/KR2013/002494, filed on Mar. 26, 2013.

(30) Foreign Application Priority Data

Mar. 26, 2012  (KR) .................. 10-2012-0030353

(51) Int. Cl.
*H02J 7/00* (2006.01)
*H02J 7/08* (2006.01)

(52) U.S. Cl.
CPC ............ *H02J 7/008* (2013.01); *H02J 7/0031* (2013.01); *H02J 7/0045* (2013.01);
(Continued)

(58) Field of Classification Search
USPC ........................................ 320/107, 133, 150
See application file for complete search history.

(56) References Cited

U.S. PATENT DOCUMENTS 5,826,958 A * 10/1998 Avitan .................. H01M 10/44
320/131
5,903,764 A * 5/1999 Shyr ...................... H02J 7/0004
307/64

(Continued)

FOREIGN PATENT DOCUMENTS

CN     101329960 A     12/2008
CN     101419434 A     4/2009
(Continued)

OTHER PUBLICATIONS

Korean Examination Report dated Jun. 28, 2016 in Korean Application No. 10-2012-0030353.

*Primary Examiner* — Samuel Berhanu
(74) *Attorney, Agent, or Firm* — Mintz Levin Cohn Ferris Glovsky and Popeo, P.C.; Kongsik Kim; Colleen H. Witherell

(57) ABSTRACT

A charger for blocking power when charging a battery is provided. The charger includes a charging voltage generating unit that generates a charging voltage for charging a battery. The charger includes a control unit with at least one microprocessor for controlling calculation and comparison and determination required for charging. A back-flow preventing unit is disposed between the charging voltage generating unit and the battery and has a plurality of diodes. A driving unit is connected between the control unit and an AC power supply unit and includes a relay for supplying/blocking AC power to the charger according to the control of the control unit. An alarm unit provides notification of a contact failure or charging completion when charging the battery. A cable connector is connected to a target device.

10 Claims, 1 Drawing Sheet

(52) U.S. Cl.
CPC ............ *H02J 7/0052* (2013.01); *H02J 7/085* (2013.01); *H02J 7/0085* (2013.01)

(56) References Cited

U.S. PATENT DOCUMENTS

| | | | | |
|---|---|---|---|---|
| 5,905,364 A * | 5/1999 | Ookita | .................. | H02J 7/0093 320/141 |
| 6,208,117 B1 * | 3/2001 | Hibi | ...................... | H02J 7/0021 320/134 |
| 7,382,113 B2 * | 6/2008 | Wai | ....................... | H02M 3/158 323/222 |
| 2011/0012554 A1 * | 1/2011 | Lin | ...................... | H02J 7/0052 320/107 |
| 2011/0304301 A1 * | 12/2011 | Kim | ........................ | H02J 9/005 320/115 |
| 2013/0099722 A1 * | 4/2013 | Umemura | ................. | B25F 5/00 320/101 |

FOREIGN PATENT DOCUMENTS

| | | |
|---|---|---|
| JP | 2003-070172 A | 3/2003 |
| JP | 2004-282950 A | 10/2004 |
| KR | 10-2001-0088503 A | 9/2001 |
| KR | 10-2005-0015734 A | 2/2005 |
| KR | 10-0956119 B1 | 5/2010 |
| KR | 10-0981973 B1 | 9/2010 |
| KR | 10-2011-0076859 A | 7/2011 |
| KR | 10-2011-0092847 A | 8/2011 |

* cited by examiner

CHARGER FOR BLOCKING STANDBY POWER AND METHOD OF CONTROLLING SAME

CROSS-REFERENCE TO RELATED APPLICATIONS

This is a continuation of International Application No. PCT/KR2013/002494 filed on Mar. 26, 2013, which claims priority to Korean Application No. 10-2012-0030353 filed on Mar. 26, 2012, which applications are incorporated herein by reference.

TECHNICAL FIELD

The present invention relates to a charger for blocking standby power of the charger, and more particularly, to a charger by which power is automatically and completely blocked without removing the power plug of the charger from the electric outlet, when charging is completed or the battery of a target device is separated in the charger for batteries, and a method for controlling the same.

BACKGROUND ART

Recent statistics from the International Energy Agency (IEA) state that wasted standby power at home in OECD member countries amounts to 10% or more of average electricity consumption. The standby power of various electronic devices refers to the power consumed for various reasons even while a specific electronic device is not in use with the power plug connected with the electric outlet. One of the recent important issues for improving energy efficiency of various electronic devices is to effectively block the standby power.

Currently, a large number of chargers are used all over the world. It is known that about 4.8 billion chargers for mobile phones are used, and the number of chargers including chargers for various electric tools would be beyond all imagination.

Specifically, assuming that a user does not usually have the charger being charged for 20 hours a day in using the charger and the charger remains plugged in the electric outlet, it may be estimated that the average wasted standby power per corresponding charger is about 0.5 W. In this case, power of about 2.4 GWH may be unwittingly wasted a day in total. Accordingly, the standby power is equally wasted, and this may cause an economic loss resulting from generation of power corresponding to the wasted standby power. Further, use of fossil fuels may increase carbon dioxide levels, which finally brings about a multitude of problems, such as environmental pollution.

Typically, in chargers for charging batteries used in various electronic devices, even though charging is completed or the target device is separated from the charger, unless the power plug of the charger is physically separated from the electric outlet, the charger still wastes standby power, causing a waste of power.

Korean Patent No. 956,119 discloses a battery charger for blocking standby power and a control method thereof. Here, the charger includes a power-blocking unit, a power factor improvement unit, a power transformation unit, a transformed power-blocking unit, a battery charging unit, an overpower-blocking unit, an electric potential detection unit, a battery status detection unit, a battery connection detecting unit, battery capacity detecting unit and a program control unit. Since the charger of the above configuration adopts a power factor control unit for controlling reactive power and improving a power factor, it has a complicated configuration, and thus the manufacturing cost of the product may increase. Accordingly, it is needed to manufacture a battery-dedicated charger for blocking standby power with a simple configuration at a low cost, compared to the conventional chargers.

Korean patent No. 10-0981973 issued to the present applicant discloses a charger for mobile phones to block standby power by which AC power input to the charger is completely blocked, when a mobile phone or a battery case for charging is separated from the mobile phone charger, or the battery of the mobile phone is fully charged. Accordingly, the charger can effectively remove standby power that has been wasted in the typical mobile phone charger. However, the charger has a configuration mainly suitable for mobile phones. Therefore, it is still required to manufacture a charger for blocking standby power with a simpler configuration and a lower cost than those of the charger for mobile phones.

SUMMARY

Therefore, the present invention has been made in view of the above-mentioned problems, and an aspect of the present invention is to provide a charger for blocking standby power and a control method thereof by which power is automatically supplied to thereby charge a battery when the battery is connected to the charger for charging. Meanwhile, when a contact failure between the charger and the battery occurs during the charging of the battery, the charger may provide an alarm. Further, the power input to the charger is automatically blocked, when the battery is separated from the charger or the battery is fully charged, to thereby perfectly prevent a waste of standby power.

Another aspect of the present invention is to provide a charger for blocking standby power and a control method thereof, by which the charger can be normally operated by manually operating a switch even when the over-discharged battery, that causes the charger not to be operated, is connected with the charger.

In accordance with an aspect of the present invention, there is provided a charger for blocking power in charging a battery (21). The charger includes: a charging voltage generating unit (15) that generates a charging voltage for charging the battery (21) by supplying predetermined AC power;

a control unit that includes at least one microprocessor for controlling calculation, comparison and determination required for the charging operation of the charger (10);

a back-flow preventing unit (11) that is positioned between the charging voltage generating unit (15) and the battery (21), includes a plurality of diodes (D1, D2 and D3), and prevents the voltage of the battery (21) and the charging voltage (Vd) from flowing backward to the charger (10);

a driving unit (13) that is connected between the control unit (12) and the a AC power supply unit, and includes at least one relay (K1) for supplying/blocking AC power to the charging voltage generating unit (15) according to the control of the control unit;

an alarm unit for informing of a contact failure or charging completion when charging the battery (21); and a cable connector (18) that connects target device (20) which accepts the battery (21) with the charger when charging.

Preferably, the charger further includes a switch (14) that is connected between a terminal of the AC power supply unit and the charging voltage generating unit (15) in parallel in order to manually operate the charger (10) when the battery (21) is over-discharged.

Preferably, the back-flow preventing unit (11) for preventing the voltage of the battery (21) and the charging voltage from flowing backward includes: diodes (D1 and D2) that are connected to supply the charging voltage to the battery of the target device (20) and a power terminal (Vc) of the microprocessor of the control unit; and a diode (D3) that is connected to transfer the voltage of the battery to the power terminal (Vc) of the microprocessor.

Selectively, the alarm unit includes a buzzer (16) that sounds a predetermined alarm according to a control signal of the control unit (12).

In accordance with another aspect of the present invention, there is provided a method for controlling a charger for blocking power in charging a battery (21). The method includes:

connecting the battery (21) in order to supply the power of the battery to a control unit (12) so that a microprocessor (μ-COM) is normally operated; controlling a driving unit (13) to thereby supply AC power to the charger (10);

when charging is normally completed to thereby reach a predetermined charging voltage (Vs), controlling the driving unit (13) to turn the transistor (Q1) off to open a relay (K1) to thereby block standby power; and controlling the microprocessor of the control unit to be operated in a sleep mode in order to minimize power consumption thereof.

Preferably, when a contact failure of the battery occurs during charging of the charger (10) and a charging voltage (Vd) suddenly changes, it is determined whether the change of the charging voltage exceeds a predetermined voltage (Vv) within a predetermined time (t1), and if the change of the charging voltage exceeds the predetermined voltage (Vv), an alarm unit is controlled to provide a predetermined alarm.

According to the present invention, the charger is automatically operated when the battery is connected to the charger, and power of the charger is automatically blocked when the battery is fully charged or separated from the charger, to thereby completely block power of the charger without separating the corresponding charger from the electric outlet. Accordingly, with the blocking of the wasted power, wasted energy and the total amount of CO2 resulting from electric power production can be reduced, which prevents global environmental pollution.

DETAILED DESCRIPTION

Figure 1:
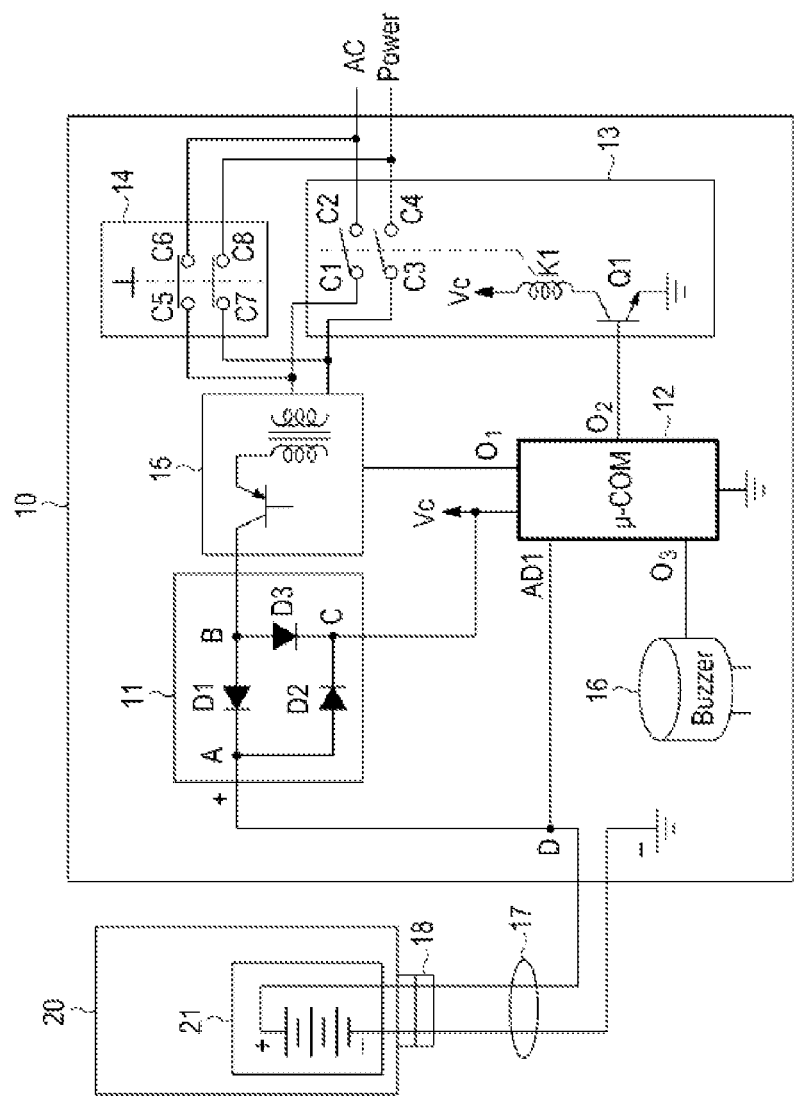
FIG. 1 is a circuit diagram of a configuration of a charger according to an embodiment of the present invention.

Hereinafter, an embodiment of a charger for blocking standby power and a control method thereof according to the present invention will be described in detail with reference to the accompanying drawing. In the following detailed description of the embodiment, names of specific elements, such as a target device, a back-flow preventing unit, a charging voltage generating unit, a driving unit, a microprocessor (μ-COM), a battery, a cable connector, a switch and a cable are used for the purpose of generally understanding the present invention, but the present invention is not limited thereto. It is obvious to those skilled in the art that these specific elements may be replaced with devices that have similar functions or may be transformed or modified into equivalents thereof without departing from the scope and concept of the invention defined by the appended claims.

Hereinafter, the configuration and operation of a charger for blocking standby power according to the present invention will be described in detail with reference to the accompanying drawing. FIG. is a circuit diagram of a configuration of a charger according to an embodiment of the present invention. Referring to the configuration of a charger 10, the charger 10 includes a control unit (μ-COM) 12 that controls calculation, comparison and determination required for charging. The control unit 12 may be a microcomputer or a microprocessor which are commercially available, and may be implemented by well-known technologies in the art. Further, the charger 10 includes a back-flow preventing unit 11 that prevents the voltage of a battery 21 and a charging voltage from flowing backward and is comprised of, for example, a combination of three or more diodes D1, D2 and D3. Here, the negative electrodes of the diodes D2 and D3 are connected with a terminal Vc of a microprocessor of the control unit 12. The charger includes a driving unit 13 that has a relay K1 for supplying and blocking power and a transistor Q1 of which one end is connected with the relay K1, and a charging voltage generating unit 15 that generates and supplies DC power for charging the battery 21 while the charger 10 is supplied with power under the control of the control unit 12.

An output terminal $O_2$ of the control unit 12 is connected with a base terminal of the transistor Q1 for driving the relay K1 of the driving unit 13 to thereby turn the relay on or off, and another output terminal $O_3$ thereof is connected with a buzzer 16 that sounds a predetermined alarm in case of necessity.

Meanwhile, when the battery 21 to be charged is over-discharged, even if the battery 21 is connected to the charger 10, the control unit 12 may not be normally operated. To this end, a switch 14 is adopted as a means for operating the charger 10 normally. The switch 14 is connected between the AC power terminal and the charging voltage generating unit 15 in parallel and plays a role of a manual switch. In addition, the buzzer 16 is connected to an output terminal $O_3$ of the control unit 12 and provides a predetermined alarm when a contact failure occurs during charging or charging is completed. Further, a cable connector 18 is provided in order to connect a target device 20 having the battery 21 accepted therein for charging with the charger 10 by a cable 17.

Hereinafter, the operation of the charger according to the present invention will be described in detail.

If the target device 20 is connected to the cable connector 18 of the charger 10 for charging while power to the charger 10 is blocked, remaining power in the battery 21 is supplied to the control unit 12, i.e., the microprocessor (μ-COM) through the diode 22 of the back-flow preventing unit 11. Then, the microprocessor is normally operated and outputs "high" power at the output terminal $O_2$ in order to supply the external AC power to the charger 10. Accordingly, the transistor Q1 of the driving unit 13 is turned on to make the relay K1 energized so that contacts C1 and C2, and contacts C3 and C4 are connected with each other, respectively, and thus the AC power is supplied to the charger 10.

After the contacts are connected with each other, the AC power is supplied to the charging voltage generating unit 15, and a voltage necessary for charging, i.e., the voltage (hereinafter, referred to as a voltage Va) of a point A which is about 0.6 V lower than the voltage (hereinafter, referred to as a voltage Vb) of a point B through the diode D1 of the back-flow preventing unit 11 is supplied to the battery 21 through the cable 17 and the cable connector 18 to thereby begin charging.

At this time, since the voltage (hereinafter, referred to as a voltage Vc) of a point C, which is 0.6 V lower than the voltage Vb through the diode D3, is supplied to the microprocessor (μ-COM) through the terminal Vc of the control unit 12 instead of the voltage of the battery, the microprocessor may continue to be normally operated. At this time, the voltage at both ends of the diode D2 is 0.6 V lower than the voltage Vb, so the circuit between the points A and C becomes an open state and the current does not flow between the points A and C. The microprocessor of the control unit 12 may control the charging voltage generating unit 15 through the output terminal $O_1$ by monitoring a charging voltage (hereinafter, referred to as a voltage Vd) of a point D through an input terminal AD1, to thereby make the appropriate charging voltage Vd continuously supplied to the target device 20.

The back-flow preventing unit 11 is connected between the charging voltage generating unit 15 and the target device 20 as well as to the input terminal Vc of the control unit 12, and includes three diodes D1, D2 and D3 as shown in the drawing. Accordingly, standby power may be blocked by using two cables without additional cables, as the same as in the typical charger with power supplied to the battery 21 and the charger 10.

In the case of occurrence of a contact failure, for example, at the cable connector 18 during charging, the charging voltage Vd suddenly rises in a short time. At this time, the control unit 12 monitors such a sudden change in the charging voltage through the input terminal AD1. Then, the control unit 12 determines that, for example, the connector of the target device 20 has been separated and switches the output power at the terminal $O_3$ of the control unit 12, for example, from "high" to "low", to thereby have the buzzer 16 sound a predetermined alarm. Accordingly, a user may recognize that the cable of the target device is separated or the connection of the connector is faulty.

Once the charging is normally completed and the charging voltage Vd has reached a charging completion voltage (hereinafter, referred to as a voltage Vs), the microprocessor of the control unit monitors the same through the input terminal AD1. At this time, when the charging voltage reaches the charging completion voltage (Vd=Vs), the control unit 12 determines that the battery has been fully charged, and controls the output power at the terminal $O_2$ to be "low" to thereby turn the transistor Q1 of the driving unit 13 off. Thus, the relay K1 is switched into a de-energized state and the contacts C1 and C2, and the contacts C3 and C4 become an open state, so that standby power is completely blocked by blocking the power.

Accordingly, after the AC power is blocked due to the open state of the contacts C1 and C2, and the contacts C3 and C4, the charging voltage Vd is not supplied, and the control unit is supplied with the power of the battery 21 through the diode D2 of the back-flow preventing unit 11. At this time, discharge of the battery 21 to the charger may be prevented by the diodes D1 and D3 that are connected in the reverse direction. Further, in order to minimize power consumption of the microprocessor of the control unit, the microprocessor proceeds to a sleep mode when the charging is completed and remains in the sleep mode until the battery 21 is separated. If the battery 21 is separated from the target device 20 and then connected thereto again, the above-mentioned control process may be repeated to thereby block standby power.

As described above, the microprocessor (μ-COM) for controlling the charging operation may be implemented by using Low-Power MiCOM that is a product of Texas Instruments Inc. (TI). In the case of adopting the Low-Power MiCOM, the current consumption in the sleep mode is equal to or less than 1 pA and it can be estimated for the corresponding battery of 1000 mAh to take at least 1,000,000 hours (about 115 years) for full discharge thereof, which may be a minute amount.

Meanwhile, in a case in which the battery 21 is over-discharged and the control unit is not normally operated even if the battery 21 of the target device is connected, a manual switch 14 that includes contacts C5 and C6, and contacts C7 and C8 is provided between the AC power terminal and the charging voltage generating unit 15. If a knob of the switch 14 is pressed, for example, when the battery is over-discharged or in an emergency, the contacts C5 and C6, and the contacts C7 and C8 are connected with each other, respectively, to operate the charging voltage generating unit 15. Thus, power is supplied to the microprocessor of the control unit 12 through the diode D3 of the back-flow preventing unit 11. Accordingly, the AC power is supplied due to the connection of the contacts C1 and C2, and the contacts C3 and C4 by controlling the driving unit 13 that plays a role of the supply/blocking of power. When the knob is released, the contacts C5 and C6 and, the contacts C7 and C8 become "open" states so that the manual switch is turned off. At this time, if the charging voltage is generated and supplied, the battery begins to be charged as set forth above.

Now, a method for determining and controlling a contact failure during charging will be described. If the battery is separated, the charging voltage Vd may suddenly change into the charging completion voltage Vs. At this time, if the change of the voltage exceeds a specific voltage (hereinafter, referred to as a voltage Vv that is assumed to be 0.3 V) within a specific time (hereinafter, referred to as time t1 that is assumed to be 1 minute), the microprocessor of the control unit 12 determines that a contact failure occurs, and controls the same. That is, if the voltage changes more than Vv within the time t1, the microprocessor monitors the same and controls the buzzer 16 to sound a predetermined alarm to inform the user of the occurrence of the contact failure in the battery charger/target device.

As described above, the charger according to an embodiment of the present invention can be operated in order to completely block power.

While the invention has been described and illustrated in connection with specific embodiments, it will be understood by those skilled in the art that the invention may be variously modified in the form and the detailed configuration without departing from the scope and concept of the present invention defined by the appended claims and equivalents thereof.

The invention claimed is:

1. A charger for blocking standby power in charging a battery (21), the charger comprising:
   a charging voltage generating unit (15) that generates a charging voltage for charging the battery (21) by supplying external AC power;
   a control unit (12) that includes at least one microprocessor for controlling calculation, comparison and determination required for the charging operation of the charger (10);
   a back-flow preventing unit (11) that is positioned between the charging voltage generating unit (15) and the battery (21), includes a plurality of diodes (D1, D2 and D3), and prevents the voltage of the battery (21) and a charging voltage (Vd) from flowing backward to the charger (10);
a driving unit (13) that is connected between the control unit (12) and a AC power supply unit, and includes at least one relay (K1) for supplying/blocking the external AC power to the charging voltage generating unit (15) according to the control of the control unit;
an alarm unit that informs of a contact failure or charging completion when charging the battery (21); and
a cable connector (16) that connects a target device (20) accepting the battery (21) with the charger when charging,
wherein when the target device (20) is connected with the cable connector (16) of the charger (10) for charging, while power to the charger (10) is blocked, the remaining power of the battery (21) is supplied to the control unit (12) through the diode (D2) of the back-flow preventing unit (11) and the control unit (12) controls the driving unit (13) to thereby make the relay (K1) energized so that the external AC power is supplied to the charger (10).

2. The charger of claim 1, further comprising a switch (14) that is connected between a terminal of the external AC power supply unit and the charging voltage generating unit (15) in parallel, and manually operates the charger (10) when the battery (21) is over-discharged.

3. The charger of claim 1, wherein the back-flow preventing unit (11) for preventing the voltage of the battery (21) and the charging voltage from flowing backward comprises:
a first diode and a second diode that are connected to supply the charging voltage to the battery of the target device (20) and a power terminal (Vc) of the microprocessor of the control unit; and
a third diode that is connected to transfer the voltage of the battery to the power terminal (Vc) of the microprocessor.

4. The charger of claim 1, wherein the alarm unit comprises a buzzer (16) that sounds a predetermined alarm according to a control signal of the control unit (12).

5. The charger of claim 1, wherein the driving unit (13) comprises at least one transistor (Q1) of which a base is supplied with a control signal output of the control unit (12), and a relay (K1) is controlled to be energized/de-energized according to turning the transistor on/off.

6. The charger of claim 5, wherein the charger (10) adopts a cable of two lines for connecting the battery (21) with the charger (10).

7. A method for controlling a charger for blocking power in charging a battery (21), wherein the charger comprises a charging voltage generating unit (15) that generates a charging voltage for charging the battery (21) by supplying external AC power; and a back-flow preventing unit (11) that is positioned between the charging voltage generating unit (15) and the battery (21), includes a plurality of diodes (D1, D2 and D3), and prevents the voltage of the battery (21) and a charging voltage (Vd) from flowing backward to the charger (10), the method comprising:
connecting the battery (21) in order to supply the power of the battery to a control unit (12) so that a microprocessor (µ-COM) is normally operated;
controlling a driving unit (13) to thereby supply external AC power to the charger (10);
when charging is normally completed to reach a predetermined charging voltage (Vs), controlling the driving unit (13) to open a relay (K1) to thereby block power; and
controlling the microprocessor of the control unit to be operated in a sleep mode in order to minimize power consumption thereof,
wherein when the target device (20) is connected with a connector (16) of the charger (10) for charging, while power to the charger (10) is blocked, the remaining power of the battery (21) is supplied to the control unit (12) through the diode (D2) of the back-flow preventing unit (11) and the control unit (12) controls the driving unit (13) to thereby make the relay (K1) energized so the external AC power is supplied to the charger (10).

8. The method of claim 7, further comprising:
when a contact failure of the battery occurs during charging by the charger (10) and a charging voltage (Vd) suddenly changes, determining whether the change of the charging voltage exceeds a predetermined voltage (Vv) within a predetermined time (t1); and
if the change of the charging voltage exceeds the predetermined voltage (Vv), controlling an alarm unit to provide a predetermined alarm.

9. The method of claim 8, wherein the predetermined time (t1) is configured to be one minute, and the voltage is configured to be about 0.3 V.

10. The method of claim 8, wherein the alarm unit comprises a buzzer (16) that provides an alarm according to a control signal from the control unit (12).

* * * * *